US011507236B2

(12) United States Patent
Dattalo et al.

(10) Patent No.: US 11,507,236 B2
(45) Date of Patent: Nov. 22, 2022

(54) SENSOR PATTERNS FOR CAPACITIVE IMAGING SENSORS IN TOUCH DISPLAYS

(71) Applicant: Synaptics Incorporated, San Jose, CA (US)

(72) Inventors: Tracy Scott Dattalo, Los Gatos, CA (US); David Hoch, Hickory, NC (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/158,896

(22) Filed: Jan. 26, 2021

(65) Prior Publication Data

US 2021/0232268 A1 Jul. 29, 2021

Related U.S. Application Data

(60) Provisional application No. 62/967,570, filed on Jan. 29, 2020.

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0445* (2019.05); *G06F 3/04164* (2019.05)

(58) Field of Classification Search
CPC combination set(s) only.
See application file for complete search history.

(56) References Cited

U.S. PATENT DOCUMENTS

| 2018/0107379 | A1* | 4/2018 | Jia ........................ G06F 3/04164 |
| 2019/0196620 | A1* | 6/2019 | Shu ........................ G06F 3/0445 |
| 2019/0302926 | A1* | 10/2019 | Sleeman .............. G06F 3/0412 |
| 2021/0034198 | A1* | 2/2021 | Wang .................... G06F 3/0446 |

* cited by examiner

*Primary Examiner* — Deeprose Subedi
(74) *Attorney, Agent, or Firm* — Ferguson Braswell Fraser Kubasta PC

(57) ABSTRACT

A sensor pattern for capacitive sensing includes a first electrode and a multitude of second electrodes capacitively coupled to the first electrode. The first electrode includes a strip extending in a vertical direction across the sensor pattern. The multitude of second electrodes include a first subset and a second subset. The first subset of the multitude of second electrodes is arranged in a first column, the first column extending in a vertical direction. The second subset of the multitude of second electrodes is arranged in a second column, the second column extending in the vertical direction. The first subset and the second subset of the multitude of electrodes are disposed adjacent to the first electrode on opposing sides of the first electrode.

14 Claims, 7 Drawing Sheets

SENSOR PATTERNS FOR CAPACITIVE IMAGING SENSORS IN TOUCH DISPLAYS

CROSS REFERENCE TO RELATED APPLICATIONS

This application claims benefit under 35 U.S.C. § 119(e) to U.S. Provisional Patent Application Ser. No. 62/967,570, filed on Jan. 29, 2020. U.S. Provisional Patent Application Ser. No. 62/967,570 is incorporated herein by reference in its entirety.

TECHNICAL FIELD

The described embodiments relate generally to electronic devices, and more specifically, to improving the performance of capacitive imaging sensors in touch displays.

BACKGROUND

Touch displays are widely used in a variety of electronic systems. A touch display typically includes a sensing region provided by a proximity sensor device that overlaps with a display screen. In the sensing region, the proximity sensor device determines the presence, location and/or motion of one or more input objects. Touch displays may be included in electronic devices ranging from small (e.g., in a smartwatch, cellular phone, etc.) to large (e.g., in a tablet, laptop, television screen, etc.) Touch displays may be used to provide interfaces for the electronic system. The display screen may provide an output interface, and the proximity sensor device may provide an input interface.

When the display screen and the proximity sensor device are highly integrated, with relatively little spatial separation between the display screen and the proximity sensor device, in some proximity sensor device designs, a large capacitive coupling between sensor electrodes of the proximity sensor device and components of the display screen may reduce the signal to noise ratio for touch sensing. This may be particularly the case in larger touch displays where the increased surface area results in an increased capacitive coupling. The increased capacitive coupling may limit the achievable sensing speed in an undesirable manner, due to the resulting high RC time constant associated with the capacitive coupling and a resistive component. In some proximity sensor device designs, long routing traces result in an increased ohmic resistance, thereby also contributing to a high RC time constant. Further, in some proximity sensor device designs, a routing trace is required for each of numerous sensing pads. The number of sensing pads and associated routing traces may scale quadratically with the surface area, potentially resulting in an undesirably high number of routing traces that are costly and/or difficult or impossible to accommodate.

It may be desirable to combine different types of proximity sensor designs to achieve the desirable characteristics such as, for example, a reduced capacitive coupling, a reduced ohmic resistance, a reduced number of routing traces, and or a tradeoff between these characteristics.

SUMMARY

In general, in one aspect, one or more embodiments relate to a sensor pattern for capacitive sensing, the sensor pattern comprising: a first electrode, wherein the first electrode comprises a strip extending in a vertical direction across the sensor pattern; a plurality of second electrodes capacitively coupled to the first electrode, the plurality of second electrodes comprising a first subset and a second subset, wherein the first subset of the plurality of second electrodes is arranged in a first column, the first column extending in a vertical direction, wherein the second subset of the plurality of second electrodes is arranged in a second column, the second column extending in the vertical direction, and wherein the first subset and the second subset of the plurality of electrodes are disposed adjacent to the first electrode on opposing sides of the first electrode.

In general, in one aspect, one or more embodiments relate to an input device, comprising: a display substrate; a stack of display layers comprising a plurality of display pixels of a display screen; at least one capacitive sensing layer disposed on the display substrate, the at least one capacitive sensing layer comprising a sensor pattern, the sensor pattern comprising: a first electrode, wherein the first electrode comprises a strip extending in a vertical direction across the sensor pattern; a plurality of second electrodes capacitively coupled to the first electrode, the plurality of second electrodes comprising a first subset and a second subset, wherein the first subset of the plurality of second electrodes is arranged in a first column, the first column extending in a vertical direction, wherein the second subset of the plurality of second electrodes is arranged in a second column, the second column extending in the vertical direction, and wherein the first subset and the second subset of the plurality of electrodes are disposed adjacent to the first electrode on opposing sides of the first electrode.

In general, in one aspect, one or more embodiments relate to a sensor pattern for capacitive sensing, the sensor pattern comprising: a first capacitive sensing layer comprising at least one electrode shaped according to a first pattern; a second capacitive sensing layer disposed in a first direction on the first capacitive sensing layer, the second capacitive sensing layer comprising at least one electrode shaped according to a second pattern, substantially similar to the first pattern, wherein the second pattern has a translational offset relative to the first pattern in a second direction, perpendicular to the first direction.

Other aspects of the embodiments will be apparent from the following description and the appended claims.

DETAILED DESCRIPTION

Figure 1:
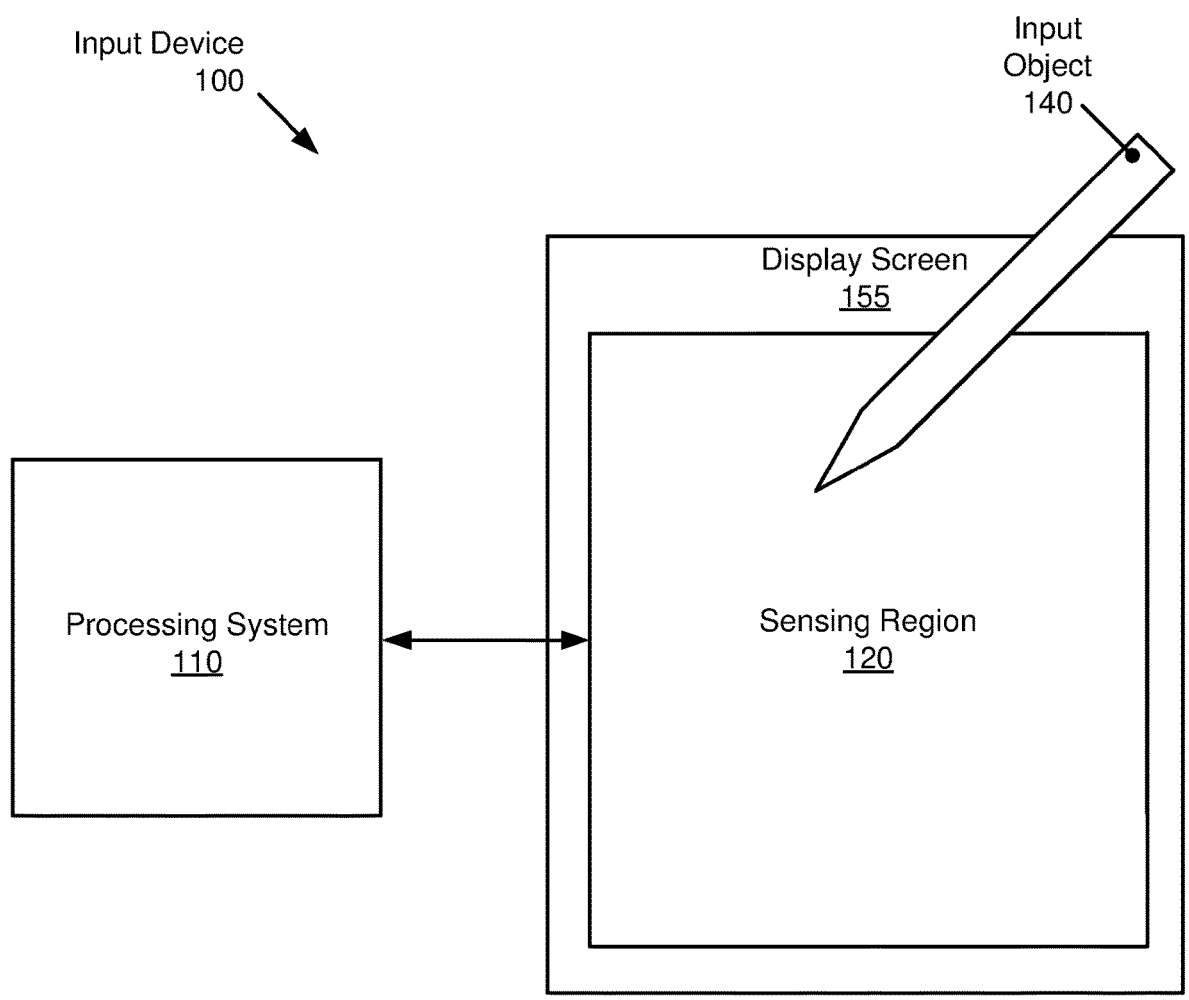
FIG. 1 shows a block diagram of an input device, in accordance with one or more embodiments.

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The following description of sensor patterns relies on terminology such as "horizontal", "vertical", "top", "bottom", and "under" to clearly describe certain geometric features of the sensor patterns. The use of these terms is not intended to introduce a limiting directionality. For example, the geometric features may be rotated to any degree, without departing from the disclosure. Further, while patterns of certain sizes are shown in the Figures, the patterns may extend and/or repeat without departing from the disclosure. For example, the use of the term columns and vertical direction is to distinguish between rows and the horizontal direction, respectively. If the input device is rectangular, any direction along the surface may be designated as the vertical direction by which a column extends and any substantially orthogonal direction along the surface may be designated as a vertical direction along which the row extends.

Various embodiments of the present disclosure provide input devices and methods for proximity sensing using sensor patterns that provide superior sensing performance. The superior sensing performance may include an accelerated sensing obtained by reducing RC time constants, and/or a reduced number of routing traces required for the sensor pattern. In one or more embodiments, the sensor pattern includes a first electrode extending in a vertical direction. Second electrodes are arranged in at least two columns, whereby each of the at least two columns also extend in the vertical direction. The two columns may be on opposing sides of the first electrode. Different embodiments that achieve one or more of these improvements are subsequently described.

FIG. 1 is a block diagram of an example of an input device (100), in accordance with one or more embodiments. The input device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, smart phones, personal digital assistants (PDAs), gaming devices, automotive infotainment systems, etc.

In FIG. 1, the input device (100) is shown as a proximity sensor device (e.g., "touchpad" or a "touch sensor device") configured to sense input provided by one or more input objects (140) in a sensing region (120). Example input objects include styli, an active pen, and fingers. Further, which particular input objects are in the sensing region may change over the course of one or more gestures.

The sensing region (120) encompasses any space above, around, in and/or near the input device (100) in which the input device (100) is able to detect user input (e.g., user input provided by one or more input objects). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. As a non-limiting example, the input device (100) may use capacitive techniques.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter", Tx) and one or more receiver sensor electrodes (also "receiver electrodes" or "receiver", Rx). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments, the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like.

Based on the sensor signals, the processing system (110) may determine when at least one input object is in a sensing region, determine signal to noise ratio, determine positional information of an input object, identify a gesture, determine an action to perform based on the gesture, a combination of gestures or other information, and/or perform other operations.

In some embodiments, the processing system (110) responds to user input (or lack of user input) in the sensing region (120), directly or indirectly, by causing one or more actions on the electronic system, such as GUI and mode changing actions. For example, the processing system (110) may report the positional information to another component that performs the action.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), microLED, liquid crystal display (LCD), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the invention. For example, various components may be combined to create a single component. As another example, the functionality performed by a single component may be performed by two or more components.

Figure 2:
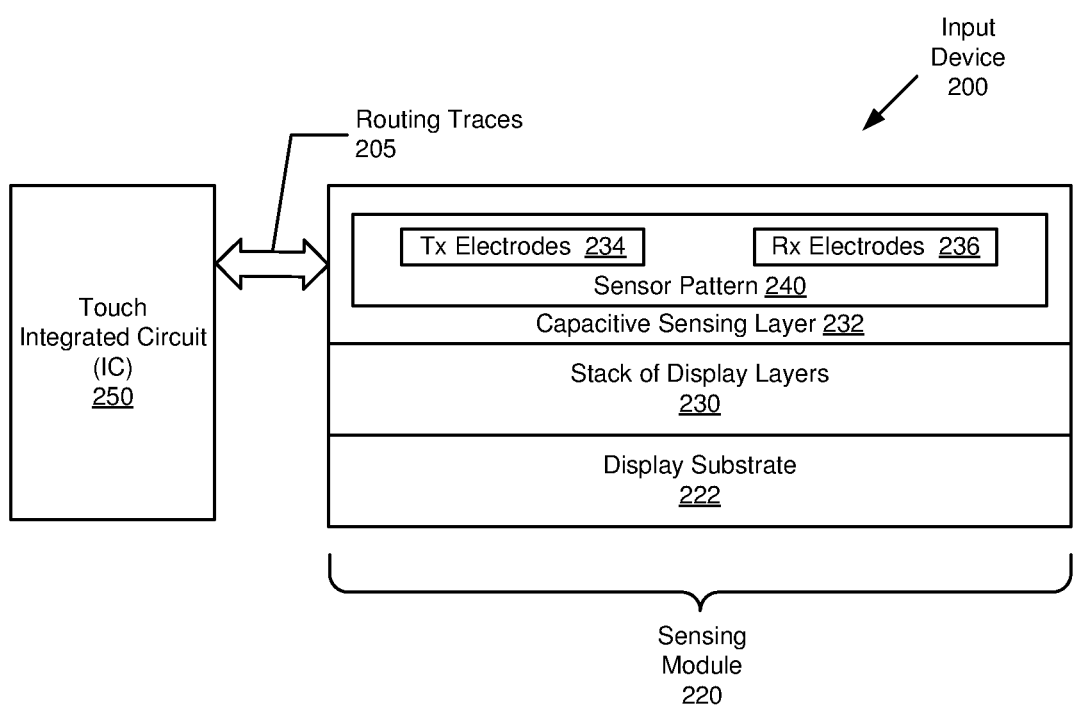
FIG. 2 shows a block diagram of an input device, in accordance with one or more embodiments.

FIG. 2 shows an input device (200) in accordance with one or more embodiments. In particular, FIG. 2 shows a cross section view of the input device (200), whereby the touch surface is located above the capacitive sensing layer (232) in FIG. 2. Namely, the touch surface, that may be touched by a user, is a layer on top of the stack of layers shown in FIG. 2. As shown in FIG. 2, the input device (200) includes a sensing module (220) coupled to a touch integrated circuit (250) via routing traces (205). The sensing module (220) may be used to implement all or a part of the sensing region (120), discussed above in reference to FIG. 1. The sensing module (220) may also be used to generate a display for all or part of the display screen (155), also discussed above in reference to FIG. 1. The touch integrated circuit (IC) (250) may be a component of the processing system (110).

In one or more embodiments, the sensing module (220) has multiple layers including a stack of display layers (230), and one or more capacitive sensing layers (232), and a display substrate (222). In one or more embodiments, the stack of display layers (230) includes one or more layers, e.g., a thin-film transistor (TFT) layer, with source lines and gate lines and transistors for controlling the individual OLED, LCD or microLED units of the pixels of the display screen. In one embodiment, the display screen is an OLED display. Accordingly, the stack of display layers (230) may include OLED display layers such as an organic emissive layer, an anode layer, a cathode layer, one or more conductive layers which may include a thin-film transistor (TFT) layer, etc. The stack of display layers (230) may be disposed on the display substrate (222). In one embodiment, the display substrate (222) is a flexible plastic substrate or another suitable flexible substrate, to enable a flexible, rollable and/or foldable OLED display. In one embodiment, the display substrate (222) is a glass substrate.

The stack of display layers (230) may include microLED layers such as a layer of LEDs disposed on a thin-film transistor (TFT) layer on the display substrate (222).

The stack of display layers (230) may include LCD display layers such as a color filter glass layer, a liquid crystal layer, and a TFT layer disposed on the display substrate (222).

The sensing module (220) may have additional layers and components. In one or more embodiments, multiple transmitter (Tx) (234) and/or receiver (Rx) (236) electrodes are disposed in the one or more capacitive sensing layers (232), arranged in a sensor pattern (240). Different embodiments of sensor patterns are discussed below in reference to FIGS. 3, 4A, 4B, and 5. The Tx (234) and/or Rx (236) electrodes may be used in capacitance sensing (e.g., absolute capacitance sensing, mutual capacitance sensing, etc.).

While in FIG. 2, the capacitive sensing layer(s) (232) are shown in a location on top of the stack of display layers (230), the capacitive sensing layer(s) (232) may be located anywhere, relative to the stack of display layers (230). For example, one layer with Rx electrodes (236) may be located on top of the stack of display layers (230), and another layer with Tx electrodes (234) may be located in or below the stack of display layers (230). Alternatively, there may be no layer with Tx electrodes. In one or more embodiments, the sensing module (220) includes sensor electrodes (Tx electrodes (234), Rx electrodes (236)) that may be bar-shaped and/or pad-shaped, organized in rows and/or columns. Routing traces may connect to the sensing pads and/or bars across the sensing region.

The touch IC (250) is circuitry configured to perform capacitance sensing, using the electrodes (e.g., transmitter electrodes (234), receiver electrodes (236)). The touch IC (250) may drive electrodes (e.g., the Tx electrodes (234) or a subset of the Tx electrodes (234)), and may receive resulting signals from electrodes (e.g., from the Rx electrodes (236) or a subset of the Rx electrodes (236)) via the routing traces (205), to determine the presence and/or position of an input object (e.g., input object (140), discussed above in reference to FIG. 1). In other words, the touch IC (250) may form an analog frontend for the capacitance sensing. The touch IC (250) may be disposed on the display substrate (222), a flexible printed circuit, or elsewhere.

Now referring to FIG. 3, FIG. 4A, FIG. 4B, and FIG. 5, various sensor patterns, in accordance with one or more embodiments, are shown. Each of the sensor patterns may correspond to the sensor pattern (240) in FIG. 2, and may include Tx electrodes (234) and/or Rx electrodes (236). Each of the sensor patterns may interface with the touch integrated circuit (250) via routing traces (205). In one or more embodiments, the sensor patterns are of a metal mesh design with one or more layers of metal electrodes and/or traces, and may be disposed on a stack of display layers (230), e.g., of an OLED display screen. The subsequently described sensor patterns may combine aspects of two topological patterns: row/column-type sensor patterns and matrix-type sensor patterns. Row/column-type sensor patterns may include a first set of elongated sensor electrodes extending in a horizontal direction, and a second set of elongated sensor electrodes extending in a vertical direction. A capacitive sensing may be performed at the intersections of the horizontally and vertically oriented sensor electrodes. Matrix-type sensor patterns may include numerous individual sensor pads or patches. In a matrix-type sensor pattern, an electrodes does not extend along any row or a column. Rather, a matrix-type sensor pattern has rows and columns (or other arrangements) formed by sets of multiple electrodes. Thus, the electrodes form a matrix, whereby each location in the matrix is an individual electrode. A capacitive sensing may be performed between adjacent sensor pads.

For larger size sensors, e.g., tablet-sized sensors, row/column-type patterns may have a large capacitive coupling to components of the display screen, resulting in a reduced signal-to-noise ratio for touch sensing. Further, some row/column-type patterns may suffer from routing constraints. On the other hand, the bar-shaped sensor electrodes of row/column-type patterns may feature a relatively low ohmic resistance.

For matrix-type patterns, each sensor electrode (in the form of a pad) must individually route back to the touch sensing interface. In other words, the matrix-type patterns do not short the sensor electrodes together. Because, in matrix-type patterns, the number of pads scales quadratically with the size of the sensor, the number of routing traces may exceed the manufacturing capabilities for a tablet-sized sensor.

Combinations of row/column-type patterns and matrix-type patterns may provide designs that address one or more of these issues. Accordingly, certain aspects of the row/column-type sensor patterns and the matrix-type sensor patterns may be combined to obtain sensor patterns in accordance with one or more embodiments. Depending on the design requirements of an electronic device to be equipped with an input device, a desired tradeoff between the different characteristics may be obtained. For example, the resulting sensor pattern may be optimized to reduce the overall connections to the touch sensing interface. Additionally or alternatively, the resulting sensor pattern may be optimized to reduce the ohmic resistance of the sensor electrodes, and/or to reduce the capacitive coupling to the display screen. The reduction of the ohmic resistance and the reduction of the capacitive coupling to the display screen may be desirable by enabling a faster sensing (as a result of a reduced RC time constant), and/or by reducing interference by display noise.

Figure 3:
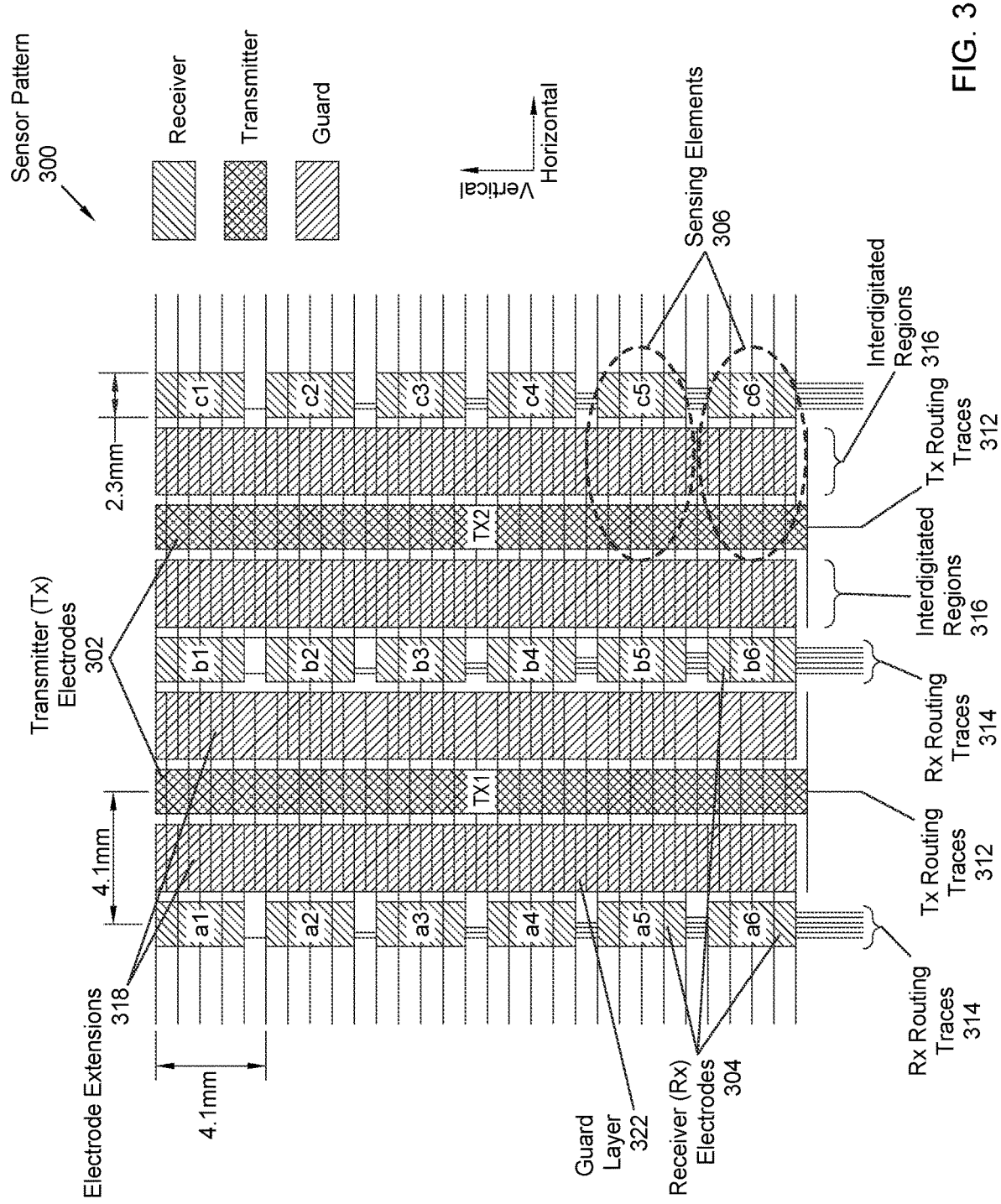
FIG. 3 shows a sensor pattern, in accordance with one or more embodiments.

Referring to FIG. 3, sensor pattern (300) includes Tx electrodes (302) in the shape of strips that, in one embodiment, are elongated, rectangular bars. Such Tx electrodes may be similar to the electrodes occurring in row/column-type patterns. The Tx electrodes may vertically span the entire sensor pattern (300), as shown in FIG. 3. The sensor pattern (300) further includes shorter bar-shaped Rx electrodes (304), arranged in columns, substantially parallel to the Tx electrodes (302). The shorter bar-shaped Rx electrodes may be comparable to pad electrodes of matrix-type patterns. The Tx (302) and Rx (304) electrodes may form an alternating pattern in a horizontal direction. Multiple sensing elements (306) may be formed by a Tx electrode (302) and multiple adjacent Rx electrodes (304). Each of the sensing elements may be used for a touch sensing, e.g., detecting presence or absence of a finger, based on a capacitance change between the Tx (302) and the Rx (304) electrode of the sensing element (306). More specifically, a localized capacitive coupling is formed between the Tx electrode (302) and the Rx electrode (304). A transcapacitance $C_t$ is, thus, associated with the sensing element (306). When an input object (not shown) approaches the sensing element (306), the transcapacitance $C_t$ may change by an amount $\Delta C_t$. A presence or absence of the input object may thus be detected by monitoring $\Delta C_t$. $\Delta C_t$ may be measured by driving a waveform onto the Tx electrode (302) and receiving a resulting signal from the Rx electrode (304). The resulting signal is a function of the waveform and $\Delta C_t$ due to the presence of an input object.

The sensor pattern (300) features a reduced ohmic resistance as a result of the bar-shaped Tx electrodes (302) (an element of row/column-type patterns), in comparison to pad-shaped TX electrodes (an element of matrix-type patterns), where routing traces to each of the pad-shaped Tx electrodes result in a relatively high ohmic resistance. The ohmic resistance associated with the sensor pattern (300) may also be lower in comparison to various other type of sensor patterns that include longer routing traces, numerous jumpers between pad-shaped electrodes, etc. Due to the sensor pattern (300) having a relatively low ohmic resistance, the RC time constant associated with the sensor pattern (300) may be reduced, therefore allowing for a faster sensing.

In comparison to row/column-type patterns which frequently have routing traces exiting the sensor pattern on two sides (one side for electrodes organized in rows, and one side for electrodes organized in columns), the sensor pattern (300) features routing traces exiting the sensor pattern (300) on one side (e.g., the bottom of FIG. 3), thereby resulting in shorter routing traces associated with a lower ohmic resistance. Routing part of the routing traces around the perimeter of the sensor pattern (as frequently needed for row/column-type patterns) is not necessary, in case of the sensor pattern (300). The design of an electronic device may be simplified with all routing traces exiting the sensor pattern (300) on one side.

Further, in comparison to matrix-type patterns, with individual routing traces to each of the pad-shaped sensor electrodes, the sensor pattern (300) significantly reduces the number of required routing traces. Broadly speaking, with only the Rx electrodes but not the Tx electrodes being matrix-like, the number or routing traces to the touch sensing interface is reduced by almost a factor of 2.

In one or more embodiments, the sensor pattern (300) includes two metal mesh layers of metal electrodes and/or traces. The metal mesh layers may be stacked (e.g., on top of the stack of display layers (230) in FIG. 2). One of the two metal mesh layers may form a top metal mesh layer and the other of the two metal mesh layers may form a bottom metal mesh layer. The spacing between the top and bottom metal mesh layers may be significantly less than the spacing between the bottom layer and the display screen underneath. For example, the spacing between the top and bottom metal mesh layers may be 0.3 µm, and the spacing between the bottom metal mesh layer and the display screen may be 10 µm. The Tx (302) and Rx (304) electrodes may be in the top metal mesh layer, whereas the bottom metal mesh layer may accommodate the Rx routing traces (314), interfacing the Rx electrodes (304) with the touch sensing interface (250). The Tx routing traces (312) may be accommodated by the top metal mesh layer. As shown in FIG. 3, some of the Rx routing traces (314) may cross under some of the Rx electrodes (304). For example, the routing trace to Rx electrode "a1" may cross under Rx electrodes "a2", "a3", "a4", "a5", and "a6". Because Rx routing traces (314) are not in direct proximity to Tx routing traces (312), a parasitic capacitive coupling between the Rx and Tx routing traces in presence of a finger or other input object is reduced, and a change in capacitance between Tx and RX routing traces caused by a finger is, therefore, negligible.

In the embodiment shown in FIG. 3, the sensor pattern (300) includes interdigitated regions (316). An interdigitated region may be located between a column formed by a Tx electrode (302) and a column formed by receiver electrodes (304). In the interdigitated regions (316), electrode extensions (318) of Tx and Rx electrodes (302, 304) spatially overlap in the horizontal direction forming a comb structure, as shown in FIG. 3. As a result, in the interdigitated regions (316), the capacitive coupling between Tx and Rx electrodes (302, 304) is significantly higher than between the bar-shaped elements of the Tx and Rx electrodes (302, 304), thereby improving the proximity sensing performance due to an increased change in capacitance, $\Delta C_f$, as an input object is present/absent.

In the embodiment shown in FIG. 3, the sensor pattern (300) further includes a guard layer (322) Because the Tx and Rx electrodes (302, 304) reside on the top layer of the two layers of the sensor patterns (300), the guard layer (322) may be disposed on the bottom layer between the interdigitated regions (316) and the display layers, to significantly reduce display interference. For example, the display interference is reduced by the guard layer providing a ground plane between the display layer and the interdigitated regions (316). In combination with the guard layer (322), the tightly spaced electrode extensions (318) provide a strong capacitive coupling between TX and RX electrodes (302, 304), while limiting the capacitive coupling to display components. Other embodiments may not include a guard layer.

While FIG. 3 shows a certain geometry of the sensor pattern (300), other geometries may be implemented without departing from the disclosure. For example, the bar-shaped elements of the Tx and/or Rx electrodes (302, 304) may be narrower, thereby increasing the share of the sensor pattern (300) that is covered by the interdigitated regions (316). Further, in some embodiments, the sensor pattern (300) is without interdigitated regions (316). Also, while the bar-shaped elements of the Tx electrodes (302) in FIG. 3 are shown as solid bars, the bar-shaped elements may include cuts or holes to reduce a background coupling to the display layers, thereby also reducing potential display interference. In general, the design of the Tx electrodes may be a tradeoff: While a wider, solid bar reduces the ohmic resistance, a narrower and/or non-solid bar reduces the background coupling. The sensor pattern (300) may also include modifications for a background balancing technique of routing the Rx routing traces fully across the sensor. Longer routing traces may be made thinner, whereas shorter routing traces may be made thicker, to balance capacitance. Longer routing traces may be made thicker, whereas shorter routing traces may be made thinner, to balance resistance. Artificial capacitors and/or resistors (e.g., dedicated capacitors and/or resistors that are not a byproduct of conductive elements of the sensor pattern (300)) may further be added to the routing traces to balance capacitance and/or resistance.

Figure 4A:
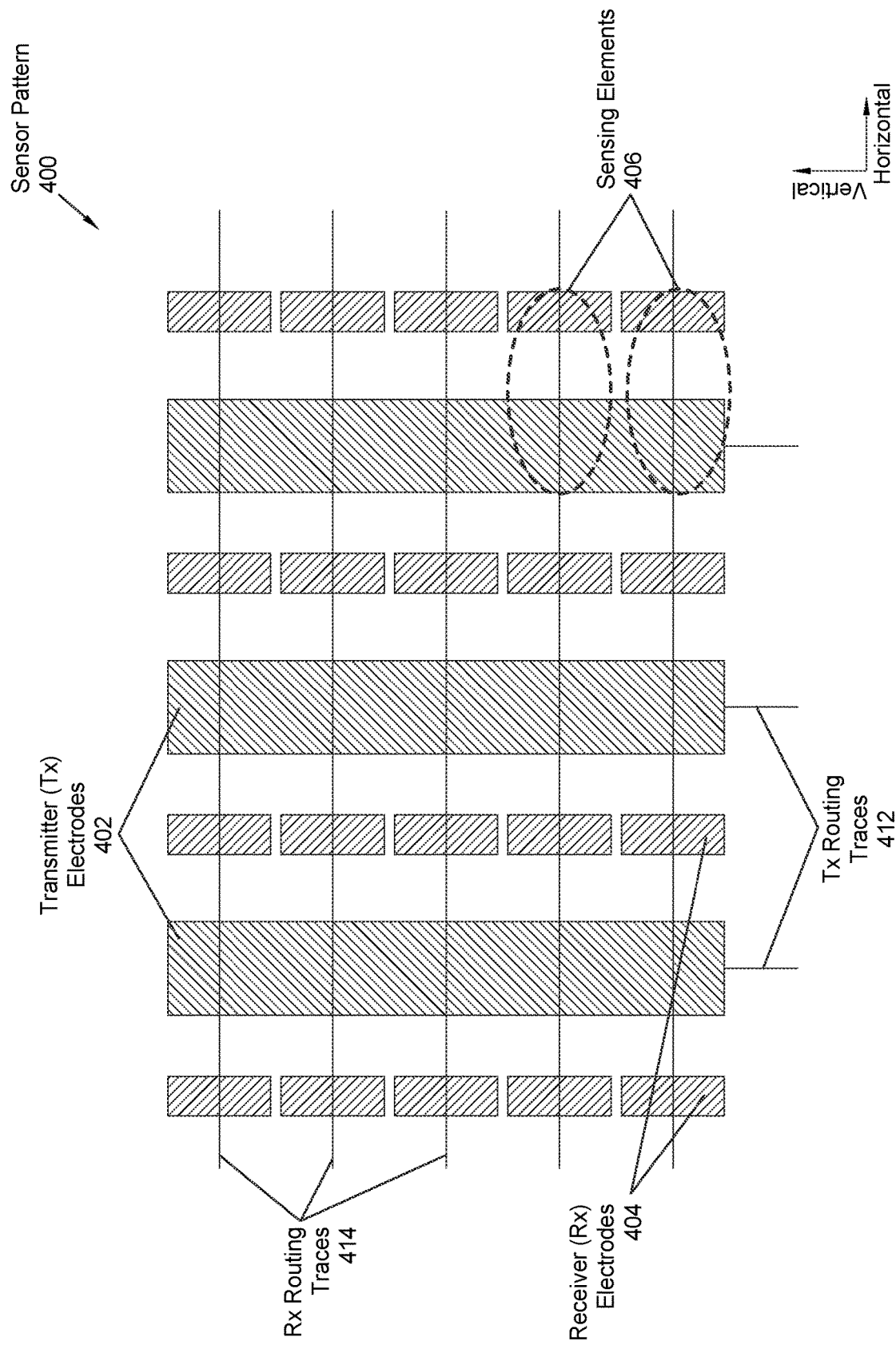
FIG. 4A shows a sensor pattern, in accordance with one or more embodiments.

Referring to FIG. 4A, sensor pattern (400) includes various components that are similar to the components of the sensor pattern (300). For example, the sensor pattern (400) includes long strip-like Tx electrodes (402) and patch-like Rx electrodes (404), arranged substantially in parallel to the Tx electrodes (402), and forming an alternating pattern in a horizontal direction. Analogous to the sensor pattern (300), the sensor pattern (400) also provides multiple sensing elements (406), each formed by a Tx electrode (402) and one of the multiple adjacent Rx electrodes (404).

The sensor pattern (400), like the sensor pattern (300), may include two layers. The Tx and Rx electrodes (402, 404) may be disposed on the same layer (e.g., on the top layer), or on different layers. Tx routing traces (412) may interface the Tx electrodes (402) with the touch sensing interface (250) as previously described in reference to FIG. 3. Unlike the sensor pattern (300), the sensor pattern (400) does not include individual routing traces to each of the Rx electrodes. Instead, the sensor pattern (400) includes routing traces (414) that interface multiple Rx electrodes in a horizontal direction. As a result, for the sensor pattern (400), the number of routing traces (Tx, Rx routing traces (312, 314)) is identical to the number of routing traces of a row/column-type pattern. The sensor pattern (400), thus, requires fewer routing traces than the sensor pattern (300), which may be a design advantage. However, as illustrated in FIG. 4, the Tx routing traces (412) and the Rx routing traces (414) do not exit the sensor pattern on a single side, which may necessitate additional design considerations when integrating the sensor pattern into an electronic device. In the sensor pattern (400), the TX electrodes (402) are associated with a low resistance, similar to the TX electrodes (302) in the sensor pattern (300). The Rx electrodes (404) may have a resistance similar to the resistance of the Rx electrodes (304) in the sensor pattern (300), depending on the routing of the Rx routing traces (414) in the interior of the sensor pattern (400). Accordingly, the sensor pattern (400) may be associated with an RC time constant approximately similar to the RC time constant of the sensor pattern (300), while requiring fewer routing traces. In comparison to other sensor patterns such as matrix-type patterns or diamond pattern designs which require relatively high resistance jumpers between the individual electrodes, the sensor pattern (400) supports a faster sensing due to a comparatively smaller RC time constant.

In one embodiment, the Tx and Rx electrodes (402, 404) are disposed on the top layer of the two-layer architecture of the sensor pattern (400). The Rx routing traces (414) may be disposed on the bottom layer, thus crossing under the Tx electrodes (402), and using vias to connect to the Rx electrodes (404). A guard layer may further be disposed on the bottom layer, to reduce a capacitive coupling with display components. In one embodiment, only the Tx electrodes (402) are disposed on the top layer of the two-layer architecture of the sensor pattern (400), whereas the Rx electrodes (404) are disposed on the bottom layer, along with the Rx routing traces (414).

While not shown in FIG. 4A, the sensor pattern (400) may include interdigitated regions as previously described in reference to FIG. 3, to improve the capacitive coupling between the Tx and Rx electrodes (402, 404).

Figure 4B:
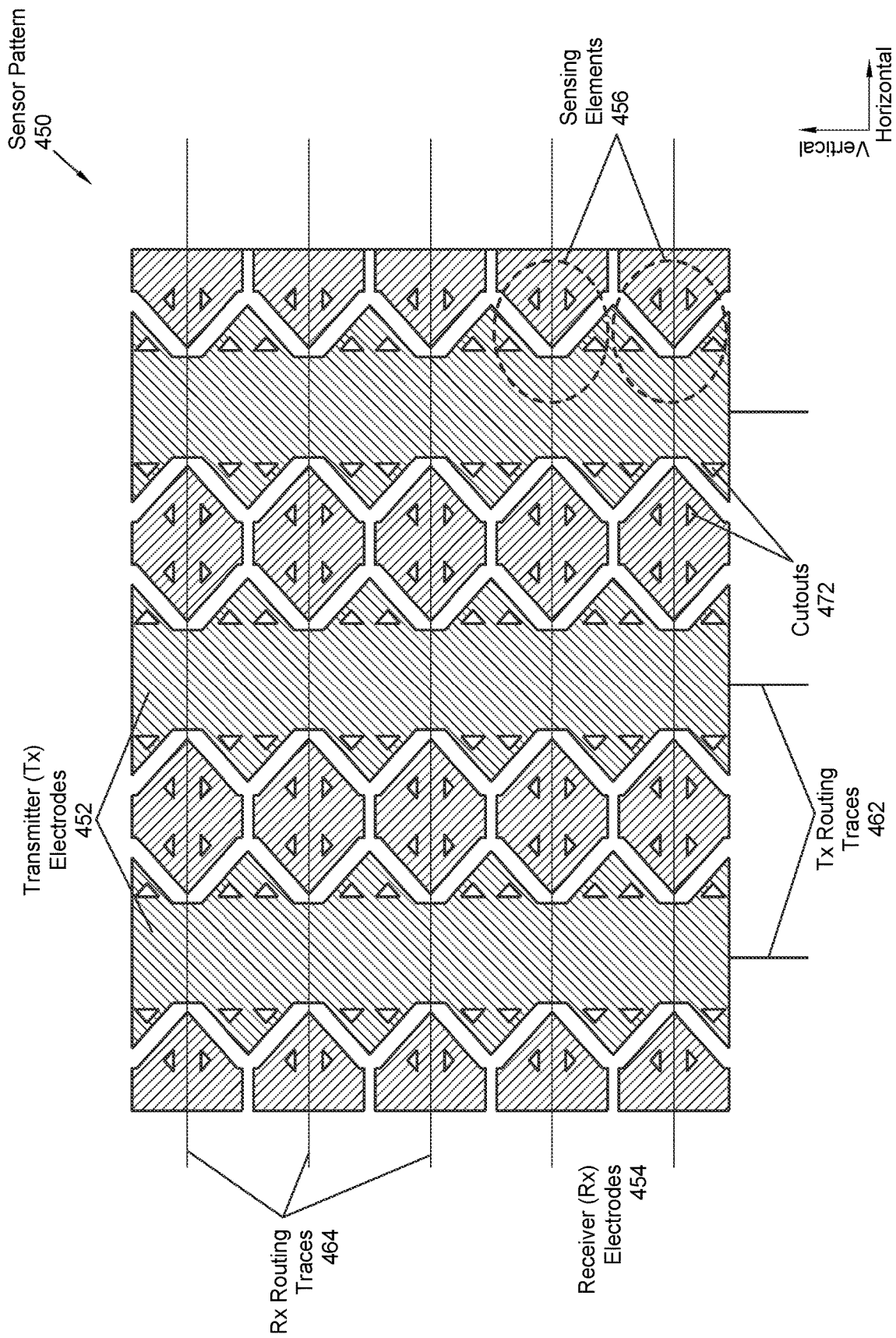
FIG. 4B shows a sensor pattern, in accordance with one or more embodiments.

Referring to FIG. 4B, sensor pattern (450) is a variation of sensor pattern (400), in which the Tx and Rx electrodes (452, 454) are non-rectangular. In comparison to the sensor pattern (400), the spatial interpolation of the sensor pattern (450) may be superior. The shape of the Rx electrodes (454) is diamond-like, whereas the Tx electrodes (452) include triangular extensions filling the space adjacent to the diamond-like shape of the Rx electrodes (454). A change in capacitance, $\Delta C_t$, between a Tx and a Rx electrode (452, 454) resulting when an input object approaches the sensing element (456) formed by the Tx and the Rx electrode (452, 454) may be increased in comparison to the sensor pattern (400) of FIG. 4, based on the shape of the Tx and Rx electrodes (452, 454). The Tx and Rx electrodes (452, 454), in the embodiment of FIG. 4B include cutouts (472). The cutouts (472) may reduce a capacitive coupling of the Tx and Rx electrodes (452, 454) to display components, while minimally impacting the ohmic resistance of the Tx and Rx electrodes (452, 454). The cutouts (472) may deviate from the triangular cutouts (472) shown in FIG. 4B in various manners. For example, the cutouts may deviate in size, geometry, number, and/or location. The design of the sensor pattern (450) may otherwise be related to the design described with reference to FIG. 4A, including the two-layer design, the Tx and Rx routing traces (462, 464), etc.

Figure 5:
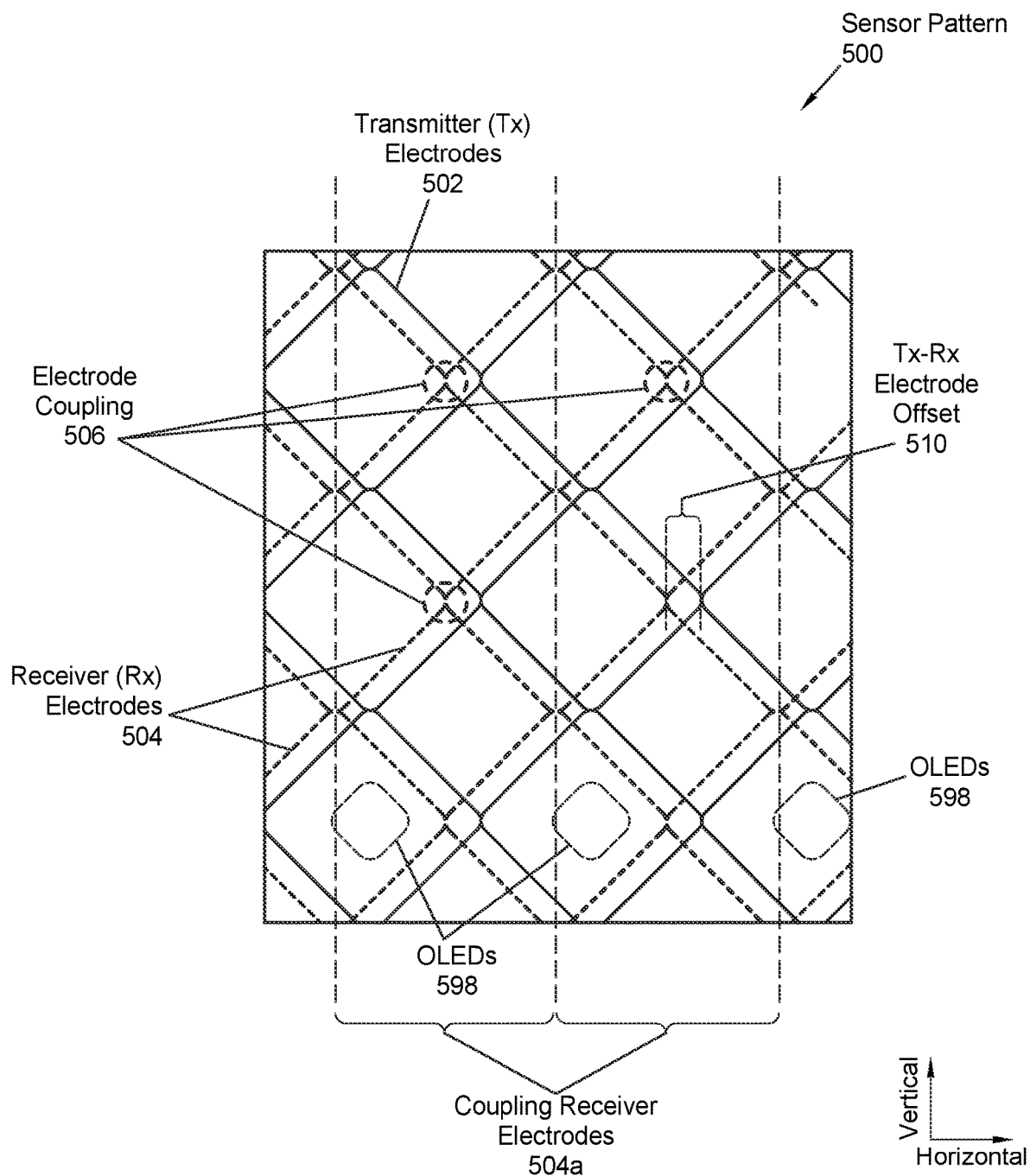
FIG. 5 shows a sensor pattern, in accordance with one or more embodiments.

Referring to FIG. 5, a section of a sensor pattern (500) is shown. The sensor pattern (500), is a metal mesh-type sensor pattern. In one or more embodiments, a Tx electrode (502) and Rx electrodes (504) are arranged on two stacked layers. The Tx electrode (502), in the example of FIG. 5 is a wire mesh spanning the entire section of the sensor pattern (500). The Rx electrodes (504), are zig-zag-shaped, extending in the vertical direction. The Rx electrodes (504) substantially match the shape of the Tx electrode (502). To reduce the capacitive coupling between the Tx electrode (502), and the Rx electrodes (504), a Tx-Rx electrode offset (510) is implemented, as shown in FIG. 5. The Tx-Rx electrode offset (510), as shown, is translational in the horizontal direction, but the Tx-Rx electrode offset (510) may alternatively be translational in the vertical direction or a translation in both the vertical and horizontal direction. In implementations of sensor patterns in which the Rx electrodes (504) are aligned with the Tx electrode (502), when the spacing between the layers carrying the Tx and Rx electrodes (502, 504) is small (e.g., 0.3 μm), the capacitive coupling may be strong, in a range of up to tens of picofarads (pFs). However, by introducing the Tx-Rx electrode offset (510), the capacitive coupling may be significantly reduced, thereby reducing the RC time constant of the sensor pattern (500), and enabling faster sensing operations. The degree of reduction of the capacitive coupling depends on the amount of the Tx-Rx electrode offset (510). The amount of Tx-Rx electrode offset (510) may be limited by the design of a sensing module (220). Specifically, the stack of display layers may include OLEDs, microLEDs, or other display elements of a display screen. In FIG. 5, a subset of OLEDs (598) is shown to illustrate how the Tx-Rx electrode offset may be limited to a shift that does not cause elements of the Tx and/or Rx electrodes to overlap with the OLEDs. An OLED may exist in each space formed by a portion of the TX electrode and the RX electrode as shown. It may be desirable to avoid an overlap because an element of a Tx or Rx electrode overlapping with an OLED may cause optical interference, resulting in visual artifacts.

The metal meshes forming the Tx and Rx electrodes (502, 504) may be sized according to the display screen. For example, an OLED display screen for a cell phone, may have a 577 pixels per inch (ppi) resolution, whereas larger display screens may have a 260-280 ppi resolution. The resolution, in one or more embodiments, dictates the period of the metal meshes forming the Tx and Rx electrodes for a homogeneous spacing of the metal meshes relative to the OLEDs (or other display technology) across the display screen. Namely, with a single OLED in each space, the higher resolution of OLEDs has a reduced period of metal meshes in order to have more spaces for the same size region.

To further reduce the capacitive coupling between Tx and Rx electrodes (502, 504), one may also increase the spacing between the layers carrying the Tx and Rx electrodes (502, 504). For example, the spacing may be increased from 0.3 μm, as initially described, to, for example, 1, 2, or 3 μm.

While the described Tx-Rx electrode offset (510) and the increased spacing reduces the capacitive coupling ($C_t$) between the Tx and Rx electrodes, the response of $\Delta C_t$ to a presence/absence of an input object remains substantially unaffected. Accordingly, the described approach may be used to reduce an undesired (parasitic) capacitance, while preserving the capacitance change to be used for touch sensing.

In one or more embodiments, two or more Rx electrodes (504) are electrically coupled. For example, in FIG. 5, assume that two Rx electrodes (504) are coupled to form a coupled Rx electrode (504a). The electrical coupling may be provided by electrode couplings (506) between the electrodes. While other Rx electrodes may not be in electrical contact with adjacent Rx electrodes, the Rx electrodes in a set of coupled Rx electrodes (504a) are in electrical contact with one another, via the electrical couplings (506). The ohmic resistance of the coupled Rx electrode (504) is lower than the ohmic resistance of a non-coupled Rx electrode. Specifically, a set of coupled Rx electrodes (504a) that includes two Rx electrodes (504) may have half the resistance of a single, non-coupled Rx electrode (504). A set of coupled Rx electrodes (504a) that includes three Rx electrodes (504) may have one third of the resistance of a single, non-coupled Rx electrode (504). In other words, sets of coupled Rx electrodes behave like resistors in parallel. While the coupling of Rx electrodes results in a lower ohmic resistance, the coupling also results in a higher background coupling and a higher capacitive coupling ($C_t$) to the Tx electrode (502). However, the higher capacitive coupling to the Tx electrode (502) may be mitigated by the Tx-Rx electrode offset (510), and/or an increase in the spacing between the layers carrying the Tx and Rx electrodes (502, 504). Coupling of, for example, two, three, four, etc., Rx electrodes may, thus, be feasible without significantly increasing $C_t$. As a result, the use of coupled receive electrodes may be suitable for lowering the RC time constant, thereby enabling a faster sensing.

While the introduction of the Tx-Rx electrode offset (510) is described based on the metal mesh-type sensor pattern (500), Tx-Rx electrode offsets (510) may also be applied to other types of sensor patterns, without departing from the disclosure.

Figure 6:
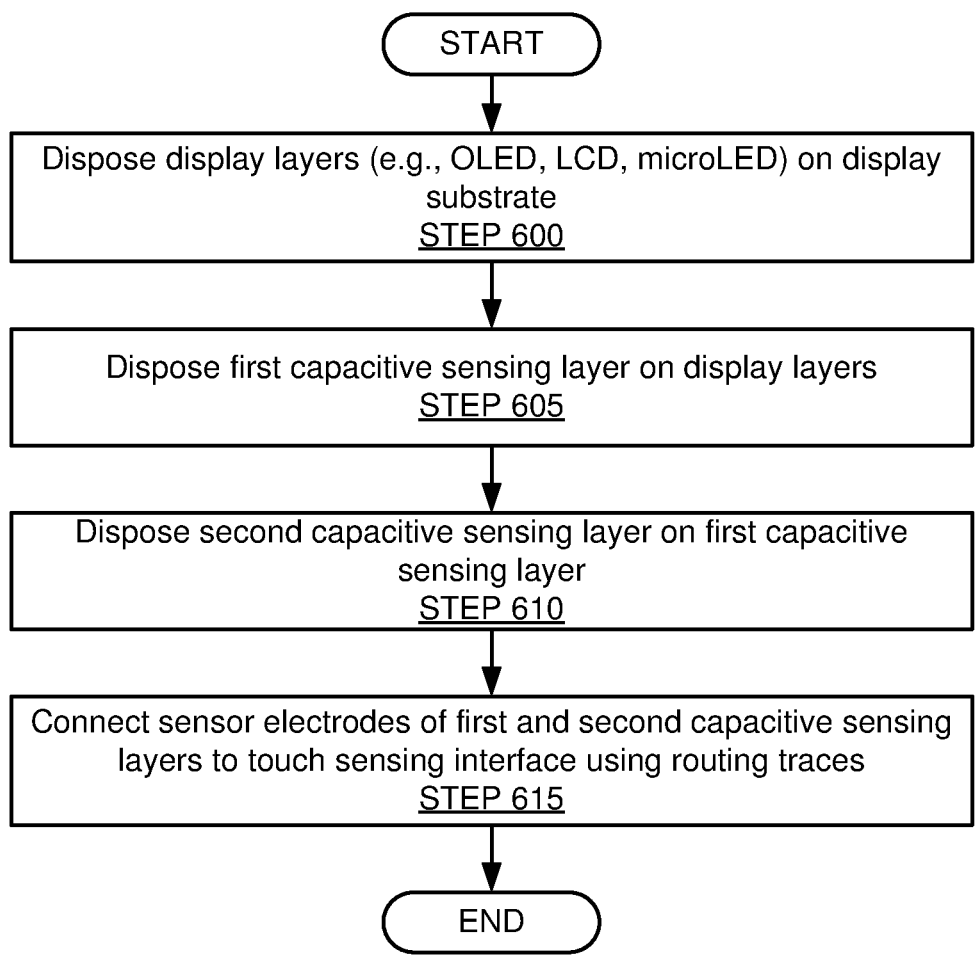
FIG. 6 shows a flowchart, in accordance with one or more embodiments.

FIG. 6 shows a flowchart in accordance with one or more embodiments. While the various steps in the flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 6.

The flowchart of FIG. 6 depicts a method of manufacturing an input device. The result of executing the process of FIG. 6 may correspond to the input device depicted in FIG. 2, including elements of the sensor patterns described in reference to FIGS. 3, 4A, 4B, and/or 5.

In Step 600, display layers are disposed on the display substrate. Depending on the display type, the disposed display layers may differ.

In case of an OLED display screen, OLED layers are disposed on the display substrate to form a stack of display layers. The disposed layers may include an anode layer, an organic conductive layer, an organic emissive layer, and a cathode layer. The anode layer may include transistors, for an active OLED display screen. The display substrate may be flexible or rigid. Various materials, including but not limited to, plastic and glass may be used.

In case of an LCD display screen, LCD layers are disposed on the display substrate to form the stack of display layers. The disposed layers may include a TFT circuitry layer with transistors, a liquid crystal layer, and a color filter glass layer. The display substrate may be glass.

In case of a microLED screen, microLED layers are disposed on the display substrate to form the stack of display layers. The disposed layers may include a TFT circuitry layer and microLEDs disposed on the TFT circuitry layer. The display substrate may be flexible or rigid. Various materials, including but not limited to, plastic and glass may be used.

Other layers such as glass or film covers may be included, without departing from the disclosure.

In Step 605, a first capacitive sensing layers is disposed on the stack of display layers. The first capacitive sensing layer may include receiving (Rx) and/or transmitting (Tx) electrodes and/or routing traces, as previously described in reference to FIGS. 3, 4A, 4B, and 5. The sensor electrodes (Tx and/or Rx) and/or routing traces may be obtained by ablation of a metal layer to obtain structures forming the Tx and/or Rx electrodes and/or routing traces, as shown, for example, in FIGS. 3, 4A, 4B, and 5.

In Step 610, a second capacitive sensing layers is disposed on the first capacitive sensing layer. The second capacitive sensing layer may include receiving (Rx) and/or transmitting (Tx) electrodes and/or routing traces, as previously described in reference to FIGS. 3, 4A, 4B, and 5. The sensor electrodes (Tx and/or Rx) and/or routing traces may be obtained by ablation of a metal layer to obtain structures forming the Tx and/or Rx electrodes and/or routing traces, as shown, for example, in FIGS. 3, 4A, 4B, and 5. In one or more embodiments, the disposing of the second capacitive sensing layer involves implementing a translational offset between the Tx and Rx electrodes, as shown in FIG. 5.

After completion of Steps 605 and 610, the sensing module (220) of FIG. 2 includes a bottom layer (obtained in Step 605) and a top layer (obtained in Step 610), disposed on the stack of display layers (230).

In Step 615, the sensor electrodes in the first and/or second capacitive sensing layer are coupled to the touch sensing interface via the routing traces.

Embodiments of the disclosure have one or more of the following advantages. One or more embodiments may enable a faster sensing due to reduced RC time constants. The RC time constant may be reduced as a result of a reduced ohmic resistance and/or a reduced parasitic capacitance. One or more embodiments may simplify the interfacing of the sensing pattern with a touch sensing interface due to a reduced number of routing traces and/or the routing traces all exiting the sensing pattern on the same side of the sensing pattern.

While the invention has been described with respect to a limited number of embodiments, those skilled in the art, having benefit of this disclosure, will appreciate that other embodiments can be devised which do not depart from the scope of the invention as disclosed herein.

What is claimed is:

1. A sensor pattern for capacitive sensing, the sensor pattern comprising:
   a first electrode, wherein the first electrode comprises a strip extending in a vertical direction across the sensor pattern;
   a plurality of second electrodes capacitively coupled to the first electrode, the plurality of second electrodes comprising a first subset and a second subset,
      wherein the sensor pattern is arranged on two stacked capacitive sensing layers,
      wherein the first subset of the plurality of second electrodes is arranged in a first column, the first column extending in the vertical direction,
      wherein the second subset of the plurality of second electrodes is arranged in a second column, the second column extending in the vertical direction, and
      wherein the first subset and the second subset of the plurality of second electrodes are disposed adjacent to the first electrode and on opposing sides of the first electrode; and
   a guard layer disposed between the first electrode and the plurality of second electrodes,
   wherein the first electrode and the plurality of second electrodes are disposed on a first layer of the two stacked capacitive sensing layers and the guard layer is disposed on a second layer of the two stacked capacitive sensing layers.

2. The sensor pattern of claim 1, further comprising:
   a plurality of routing traces coupled to the plurality of second electrodes, the plurality of routing traces disposed on the second layer of the two stacked capacitive sensing layers.

3. The sensor pattern of claim 2, further comprising:
   a routing trace associated with the first electrode, and
   wherein the plurality of routing traces associated with the plurality of second electrodes and the routing trace associated with the first electrode exit the sensor pattern in the vertical direction.

4. The sensor pattern of claim 1, further comprising:
   a plurality of routing traces coupled to the plurality of second electrodes and exiting the sensor pattern in a horizontal direction,
   wherein each of the plurality of routing traces is coupled to one electrode of the first subset of the plurality of second electrodes and one electrode of the second subset of the plurality of second electrodes.

5. The sensor pattern of claim 1, wherein each of the first electrode and the plurality of second electrodes comprise a plurality of extensions that overlap, in a horizontal direction, to form interdigitated regions.

6. The sensor pattern of claim 1, wherein the plurality of second electrodes is diamond-shaped.

7. The sensor pattern of claim 1, wherein at least one of the first electrode and the plurality of second electrodes comprises cutouts.

8. The sensor pattern of claim 1, wherein the first electrode is configured to operate as a transmitter electrode in a transcapacitance sensing configuration, and
wherein the plurality of second electrodes is configured to operate as a receiver electrode in the transcapacitance sensing configuration.

9. An input device, comprising:
a display substrate;
a stack of display layers comprising a plurality of display pixels of a display screen;
at least one capacitive sensing layer disposed on the display substrate, the at least one capacitive sensing layer comprising a sensor pattern, the sensor pattern comprising:
  a first electrode, wherein the first electrode comprises a strip extending in a vertical direction across the sensor pattern;
  a plurality of second electrodes capacitively coupled to the first electrode, the plurality of second electrodes comprising a first subset and a second subset,
    wherein the first subset of the plurality of second electrodes is arranged in a first column, the first column extending in the vertical direction,
    wherein the second subset of the plurality of second electrodes is arranged in a second column, the second column extending in the vertical direction, and
    wherein the first subset and the second subset of the plurality of second electrodes are disposed adjacent to the first electrode and on opposing sides of the first electrode; and
  a guard layer disposed between the first electrode and the plurality of second electrodes, wherein the guard layer is disposed on a second layer separate from the at least one capacitive sensing layer on which the first electrode and the plurality of second electrodes are disposed.

10. The input device of claim 9, wherein the sensor pattern further comprises:
a plurality of routing traces coupled to the plurality of second electrodes, the plurality of routing traces disposed on the second layer.

11. The input device of claim 10, wherein the sensor pattern further comprises:
a routing trace associated with the first electrode, and
wherein the plurality of routing traces associated with the plurality of second electrodes and the routing trace associated with the first electrode exit the sensor pattern in the vertical direction.

12. The input device of claim 9, wherein the sensor pattern further comprises:
a plurality of routing traces coupled to the plurality of second electrodes and exiting the sensor pattern in a horizontal direction,
wherein each of the plurality of routing traces is coupled to one electrode of the first subset of the plurality of second electrodes and one electrode of the second subset of the plurality of second electrodes.

13. A sensor pattern for capacitive sensing, the sensor pattern arranged on two stacked capacitive sensing layers comprising:
a first capacitive sensing layer comprising at least one electrode shaped according to a first pattern;
a second capacitive sensing layer disposed in a first direction on the first capacitive sensing layer, the second capacitive sensing layer comprising at least one electrode shaped according to a second pattern, substantially similar to the first pattern,
  wherein the second pattern has a translational offset relative to the first pattern in a second direction, perpendicular to the first direction; and
a guard layer disposed between the at least one electrode shaped according to the first pattern and the at least one electrode shaped according to second pattern, wherein the guard layer is disposed on a second layer of the two stacked capacitive sensing layers.

14. The sensor pattern of claim 13, wherein the second capacitive sensing layer comprises a second electrode adjacent to the at least one electrode,
wherein the second electrode is electrically coupled to the at least one electrode of the second capacitive sensing layer by at least one electrode coupling on the second capacitive sensing layer.

* * * * *